United States Patent [19]
Johnson et al.

[11] Patent Number: 5,917,897
[45] Date of Patent: Jun. 29, 1999

[54] SYSTEM AND METHOD FOR CONTROLLING A TELECOMMUNICATION NETWORK IN ACCORDANCE WITH ECONOMIC INCENTIVES

[75] Inventors: Jack J. Johnson; William F. Coyle, both of Summit, N.J.

[73] Assignee: Summit Telecom System, Inc., Summit, N.J.

[21] Appl. No.: 09/003,170

[22] Filed: Jan. 6, 1998

Related U.S. Application Data

[63] Continuation-in-part of application No. 08/804,542, Feb. 24, 1997.

[51] Int. Cl.$^6$ .................................................. H04M 15/00
[52] U.S. Cl. .......................... 379/114; 379/113; 379/115; 379/130; 379/133
[58] Field of Search ..................................... 379/112, 113, 379/114, 115, 121, 130, 133, 134, 220, 221

[56] References Cited

U.S. PATENT DOCUMENTS

| | | | |
|---|---|---|---|
| 5,420,914 | 5/1995 | Blumhardt | 379/115 |
| 5,508,999 | 4/1996 | Cox, Jr. et al. | 370/17 |
| 5,638,433 | 6/1997 | Bubien, Jr. et al. | 379/130 |
| 5,802,502 | 9/1998 | Gell et al. | 379/114 |

*Primary Examiner*—Vijay Shankar
*Attorney, Agent, or Firm*—Allen N. Friedman; McCarter & English, LLP

[57] ABSTRACT

Telecommunication switches (e.g., PBX's or local exchange carrier's Centrex-enabled switches) route calls in accordance with economic incentives (e.g., least cost routing) resulting from a bidding process between participating telecommunication Carriers (Carriers) by operation of a central processor, a computer referred to as a bidding moderator (Moderator). Each of the Carriers bidding for traffic over a route informs the Moderator of the rate it is willing to charge for (or other economic incentive it is willing to offer) service between two specific points in a telecommunication network, for example, from one NPA-NXX to another NPA-NXX, at some particular time. This "bid" rate may be lower than that Carrier's established rate for any of several reasons (e.g., the Carrier has excess capacity on that route at that time). The Carrier may change its bids as often as it likes during the day as traffic patterns change. The Moderator collects this bid information from all the Carriers, processes the bid information and transmits carrier selection information to subscribing switches. Bid information is also transmitted to participating Carriers' network management centers. From the list of all Carriers providing bid information to the Moderator, each Subscriber can select those Carriers to which it wants traffic routed and can change that selection at any time.

54 Claims, 12 Drawing Sheets

SYSTEM AND METHOD FOR CONTROLLING A TELECOMMUNICATION NETWORK IN ACCORDANCE WITH ECONOMIC INCENTIVES

This application is a Continuation-in-Part of copending application Ser. No. 08/804,542, filed Feb. 24, 1997.

BACKGROUND OF THE INVENTION

1. Field of the Invention

The invention is in the field of telecommunication network control.

2. Description of the Background Art

Many locally managed telecommunication systems, such as PBXs, employ "least cost routing" software to reduce telecommunication costs. The system's manager arranges with more than one interexchange Carrier to carry the system's traffic from the local exchange to which it is connected to other exchanges. The manager keeps track of each Carrier's charges and populates the routing table in the "least cost routing" software. The charges may be the regularly tariffed charges of the subscriber's primary Carrier or contracted charges offered by an alternate Carrier for a bulk discount or for discounting traffic during a specific time period during the day. The "least cost routing" software will examine each call attempt and automatically decide which Carrier is the best economic choice for that call. If the call attempt fails, the software usually defaults the call attempt to the subscriber's primary Carrier.

Recently a great deal of competition has developed between telecommunication carriers. This has been stimulated by both regulatory and technological changes. As telecommunication becomes more of a commodity it would be of great benefit to consumers to stimulate this competition and facilitate the consumer's ability to make economic choices between telecommunication carriers.

SUMMARY OF THE INVENTION

Provision of telecommunication services is presently dominated by fixed contractual relationships between users and service providers. However, because of technological and regulatory changes, telecommunication service is becoming more of a commodity, with competition between service providers for the users' traffic. The herein disclosed invention stimulates this competition and facilitates the consumer's ability to make economic choices between telecommunication carriers. In this method and system, telecommunication switches route calls in accordance with economic incentives (e.g., least cost routing) resulting from a bidding process between participating telecommunication carriers (Carriers), administered by a bidding service provider through operation of a central processor, a computer referred to as a bidding moderator (Moderator).

In this arrangement, each of the Carriers transmits to the Moderator the rate it is willing to charge (or other economic incentive it is willing to offer) for service between two specific points, from an originating point to a terminating point, at some particular time. This "bid" rate may be lower than that Carrier's established rate for any of several reasons (e.g., the Carrier has excess capacity on that route at that time). The Carrier may, for example, also decide for capacity or competitive reasons to place the same bid on all traffic originating at a specified network switching end point (e.g., an NPA-NXX) independent of destination or on all traffic independent of originating point and destination. The Carrier may change its bids as often as it likes during the day as traffic patterns change. The Moderator collects this bid information from all the Carriers, sorts it among originating points, and may further process this information to, for example, select for particular routes or for individual calls. The Moderator then transmits selected portions of this information to each appropriate subscribing switch location and to participating Carriers' network management centers. Each subscribing switch (Subscriber) gets the rate information or carrier selection information from the Moderator for all "point-to-point routes" originating at the Subscriber's location. The Moderator provides each Carrier with bid information from other Carriers for at least a portion of all point-to-point routes for which any Carrier has submitted a bid (e.g., any NPA-NXX to any other NPA-NXX, or otherwise-defined telecommunications network destination, in the world). A point-to-point route may originate and terminate within a single local exchange area.

From the list of all Carriers providing bid information to the Moderator, each Subscriber can select those Carriers to which it wants traffic routed and can change that selection at any time. The Subscriber downloads the carrier selection information of those selected Carriers into the routing tables of the "least cost routing" software in its switch. After each new bid is submitted by a Carrier and is processed by the Moderator, the rate or carrier selection information will be distributed to the relevant Subscribers and rate information will be distributed to other Carriers. The Carriers receiving the information will have the opportunity thereafter to submit a lower or higher bid for any point-to-point routes on which they wish, respectively, to stimulate or discourage additional traffic.

Similarly, the Moderator could offer a different class of service directly to end users who are calling parties. As part of such a service, Carriers will provide an economic incentive for all such end users in a given local exchange area (e.g., an NPA-NXX or group of NPA-NXXs served by a switch) to originate calls terminating anywhere (e.g., by means of a low rate or stated discount). In that case the Moderator would broadcast (e.g., by wired data link or wireless transmission) rate information or carrier selection information generated by the Moderator to an interface unit at each end user location. The information may be displayed for evaluation by the end user or processed within the interface unit, with direction from the end user, and all outgoing calls routed to the selected Carrier. If the Carrier information is displayed for the end user, the user can choose a Carrier for a call attempt and key in the selected Carrier's Carrier identification code before the desired destination address (e.g., telephone number). If the information is processed automatically within an interface unit in the line between the user's terminal equipment and the local exchange switch, the interface unit can, for example, automatically insert the appropriate Carrier identifier before outgoing telephone numbers.

Through this bidding process, Carriers can compete for traffic on selected routes or compete for traffic originating from selected points in telecommunication networks. They can also manage their network traffic by adjusting their bids from time to time, depending on network traffic information or other network information. And users can easily make economic choices.

DETAILED DESCRIPTION OF THE INVENTION

Figure 1:
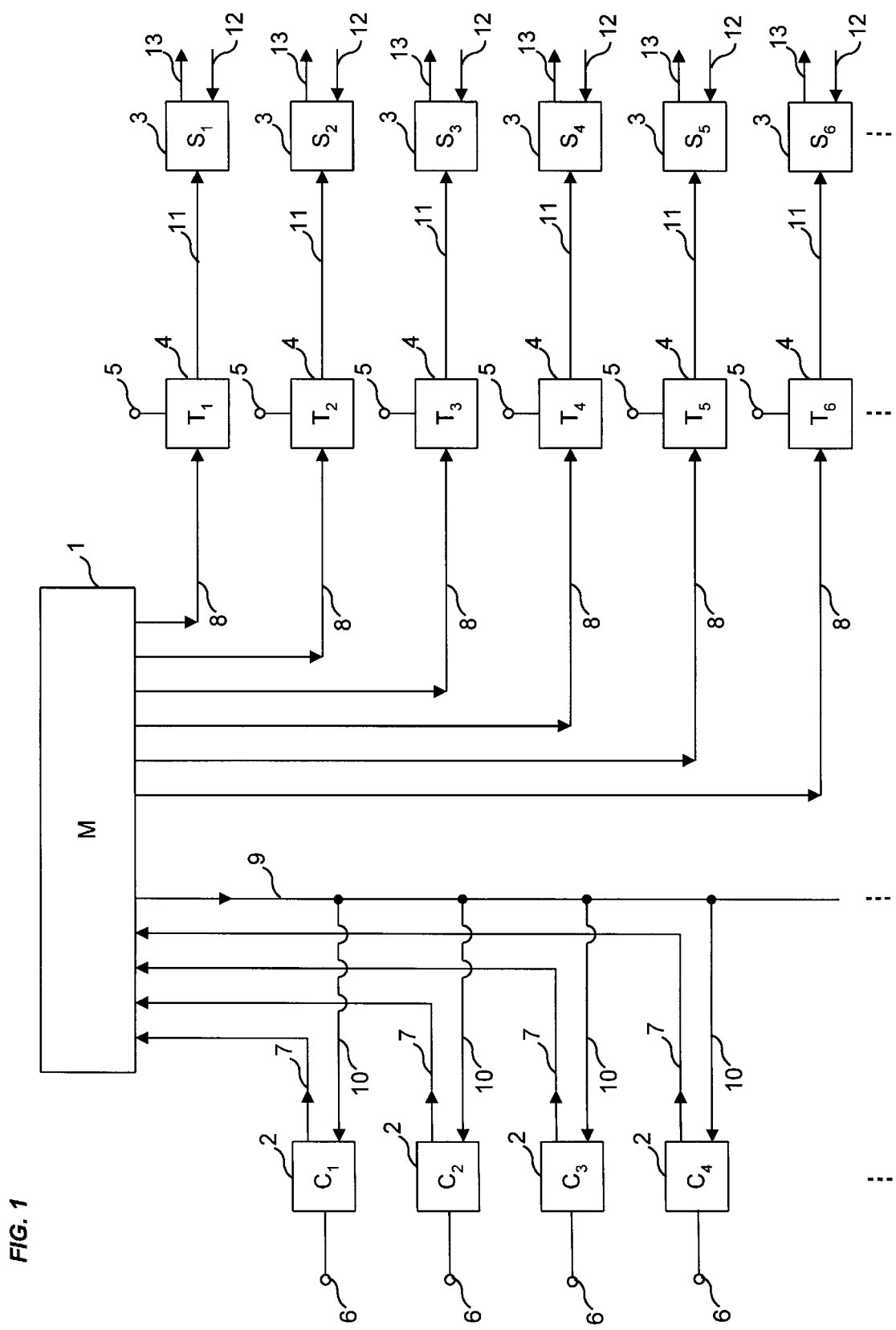
FIG. 1 is a schematic view of an exemplary system of the invention showing dedicated communication lines from each Carrier to the Moderator, from the Moderator to each of the subscribing switches, and a common data link from the Moderator to each of the Carriers.

FIG. 1 shows an exemplary system for carrying out the herein disclosed bidding process for telecommunication services, in which a Moderator 1 administers collection and dissemination of bidding information. The Moderator 1 includes a computer with a processor and memory, together with input and output devices to communicate with the Carriers' network management computers 2, which are the source of the bidding information, and the switches 3, which are the ultimate users of the information.

The Carriers are, primarily, interexchange Carriers that carry telecommunication traffic between network switching end points (i.e., local exchange switches or equivalent local switching nodes). By means of the FIG. 1 system, for example, the Carriers bid for traffic from a local exchange switch 3, or from subscribing switches 3 associated with a local exchange switch, to other local exchange switches. Some circumstances may result in the bidding process controlling carriage of a call within a single local exchange area. A local exchange area is, typically, the geographic region served by a local exchange switch (or equivalent local switching node). The Carriers transmit their bids from their network management computers 2 over data links 7, which may be either analog (using modems) or digital. However, the information is usually transmitted in digital form for input into the Moderator 1. Each Carrier has a network administrator who enters network management instructions into each network management computer 2 through input port 6 by means, for example, of a keyboard or a data link from a remote site or local computer.

A local exchange switch (or equivalent local switching node) is generally considered to be (i) the switching point on a telecommunications network that serves as the most immediate switching interface between the calling party and that telecommunications network as well as (ii) the switching point on a telecommunications network (which may, but need not be, owned or operated by the same carrier who owns or operates the originating switching point) that serves as the most immediate switching interface between the called party and that telecommunications network, regardless of whether such telecommunications networks use circuit-switched, frame relay, asynchronous transfer mode, packet data, TCP/IP protocols or other current or evolving telecommunication technologies. Local exchange switches (or equivalent local switching nodes), for example, may include telephone companies' local central office switches, private telecommunications networks' local access nodes, and Internet service providers' local access switches—whether represented by a server, router or other switching device (which may be hardware or software-defined), but in each case providing access to the respective telecommunications network. These network switching end points define a "route" for which Carriers can submit bids to the Moderator in order to compete to provide service to end users attempting to make calls over such routes.

Carriers may submit bids for routes to the Moderator for different types of telecommunications networks (e.g., circuit-switched, frame relay, asynchronous transfer mode, packet data networks such as the Internet, etc.) and for different classes of telecommunications service provided by such networks (e.g., transmission of voice, data, video, etc.). Access to such telecommunications networks by end users or by other telecommunications carriers or service providers may be, for example, via the public switched telephone network, dedicated facilities, private lines, wireless facilities, coaxial cable, electric utility power lines, Ethernet or other local area network (LAN), metropolitan area network (MAN) or wide area network (WAN) connections.

The Moderator 1 receives the bids, processes them in its processor to produce Carrier selection data, and enters both into a database in its memory by means of the data buses and registers internal to a computer. The Carrier selection data, applicable to each subscribing switch 3, are transmitted to such switch 3, perhaps by way of a computer 4 adjunct to the switch 3 over a data link 8. The data link 8 is illustrated as a dedicated transmission facility between the Moderator 1 and each switch 3. However, any other transmission technology offering a selective way to transmit data from the Moderator 1 to the switch may be used. (A "transmission facility" is a telecommunication path or channel. It may be, for example, a wired link, a radio channel in a wireless system, or a time slot in a digitally multiplexed optical transmission system). The data inputs and outputs of the Moderator 1, the network management computers 2, the adjunct computers 4, and the switches 3 are implemented by such devices as interfaces, registers and modems that are well known in the art.

Figure 8:
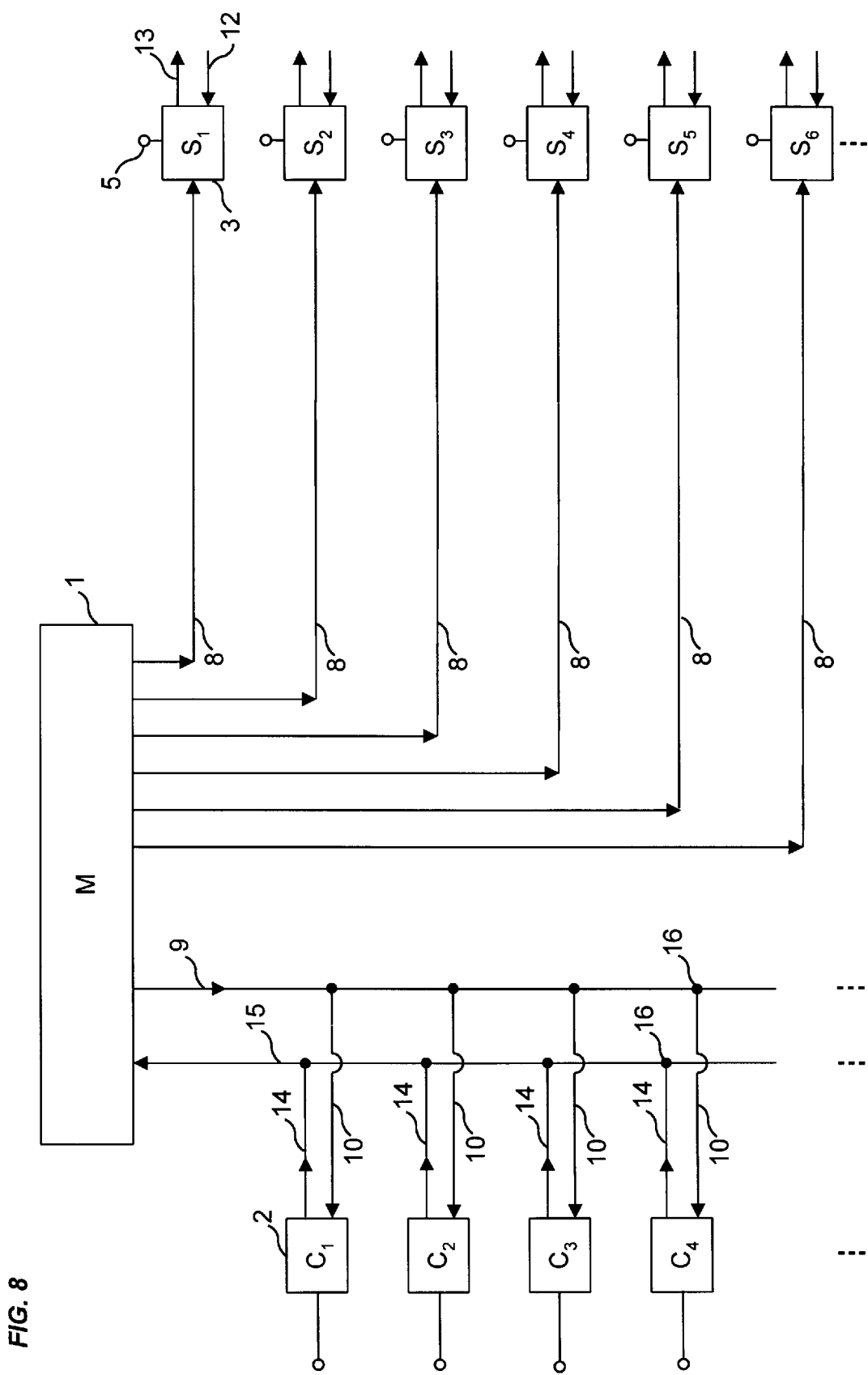
FIG. 8 is a schematic view of an exemplary system with the invention in which the Moderator transmits data directly to its switches.

As illustrated in FIG. 8, the Moderator 1 processes the bids to prioritize them for each route, producing derivative data, including Carrier selection data. This data can reflect, for example, designation of a selected Carrier and alternate Carriers, based on the Carriers' bids for each route. The Moderator 1 transmits the applicable bids and/or the derivative data to the switch 3. The Moderator 1 or the switch 3 can also designate a default Carrier in the event a call cannot be completed via a Carrier selected by the bidding process. The switch 3 can also be equipped to override the Moderator's selection in accordance with decision rules from the switch administrator 5.

An adjunct computer is known in the art to be a computer, closely associated with a switch, that provides the switch's operating software additional data or operating logic to provide the switch with additional operational capability. In the herein disclosed architecture, while primary processing of the bid data to produce carrier selection data is performed in the Moderator, as illustrated in FIG. 1, the adjunct computer 4 can be employed to enter the carrier selection data received from the Moderator 1 into a database in its memory and receive, through input port 5, decision rules from the switch administrator. Software in the adjunct computer's processor can then access the data in memory and apply the decision rules to the carrier selection data, producing the data required to populate the routing tables of the least cost routing software in the switch 3. The adjunct computer 4 communicates with the switch 3 over a digital data link or data bus 11. If the switch 3 has enough processing capacity, the function of the adjunct computer 4 may be incorporated in the switch's processor and memory, the function being implemented in the processor by appropriate software. In this case the switch must also provide input ports to receive transmission link 8 and input 5 for the switch administrator. Each switch 3 receives call attempts over incoming lines 12. Each call attempt includes routing data identifying the call's destination. The switch's least cost routing software then selects the Carrier to which the call attempt shall be routed over outgoing line 13.

Figure 9:
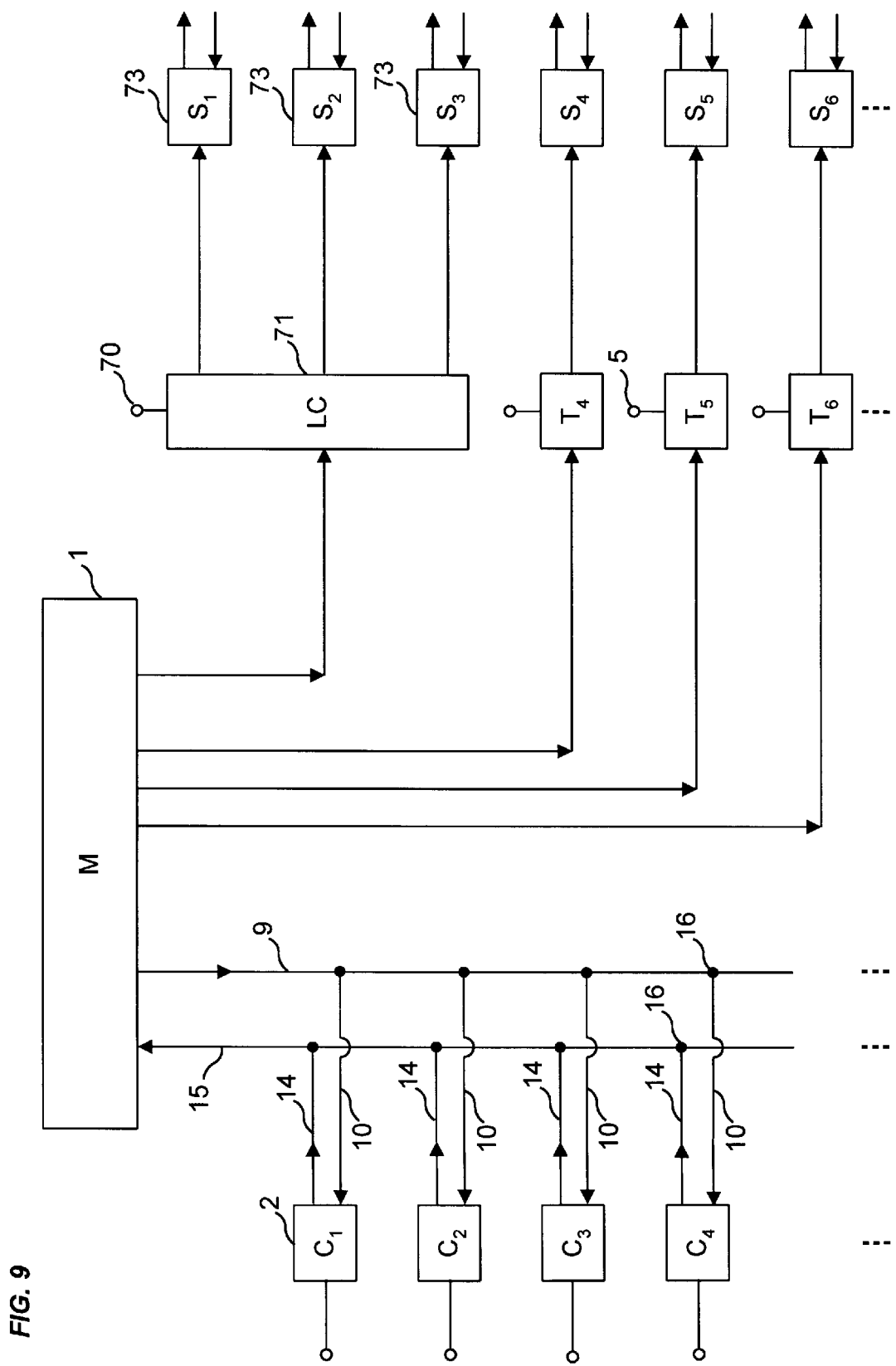
FIG. 9 is a schematic view of an exemplary system of the invention in which the Moderator transmits data to a computer associated with a plurality of switches.

In the implementation illustrated in FIG. 9, an adjunct computer 71, perhaps belonging to a local exchange Carrier, receives the carrier selection data from the Moderator 1, further processes the data and controls Carrier selection in the switches 73 under its control. Routing tables in the switches 73 can be populated periodically by data from the adjunct computer 71 or the switch 73 can query the adjunct computer 73 as each call attempt is presented. The adjunct computer 71 can receive selection rules and other administrative directions from a local Carrier administrator 70.

An alternative to use of a PBX, a private switch, is subscription to Centrex service, in which the end users' switch is a software-defined portion of the local central office switch of the local exchange telephone carrier. With data links between the adjunct computer 4 and the local central office switch, the end users' switch administrator can administer the end user portion of the bidding process in much the same way as if a PBX were being administered. In addition, instead of using a PBX or subscribing to a Centrex service, a residential or business customer could subscribe to a "least cost routing" feature offered by the local exchange telephone carrier as part of its enhanced calling services (currently including call waiting, call forwarding, 3-way calling, speed dialing, etc.). As with Centrex service the end users' switch enabling these enhanced calling features is a software-defined portion of the local central office switch.

The Moderator 1 also transmits received bids to the network management computers 2 of Carriers over the data link 9, 10. The exemplary architecture of FIG. 1 shows a combination of a single output data link 9 and individual Carrier input links 10 for this Moderator-to-Carriers bid data, indicating that the Moderator 1 may send the same data to all Carriers. There are many alternate transmission technologies available to broadcast this bid data to all Carriers, including dedicated bidirectional links between the Moderator 1 and each Carrier, combining the function of links 7, 9, and 10.

Depending on the particular implementation, it may be appropriate to transmit all received bids to all Carriers. However, each Carrier's bids need not be transmitted back to the bidding Carrier and there may be Carriers with limited service areas that are not interested in receiving bids from out-of-area Carriers. In any event, at least a portion of the bids are transmitted to at least a portion of the Carriers in order to implement an auction.

Figure 2:
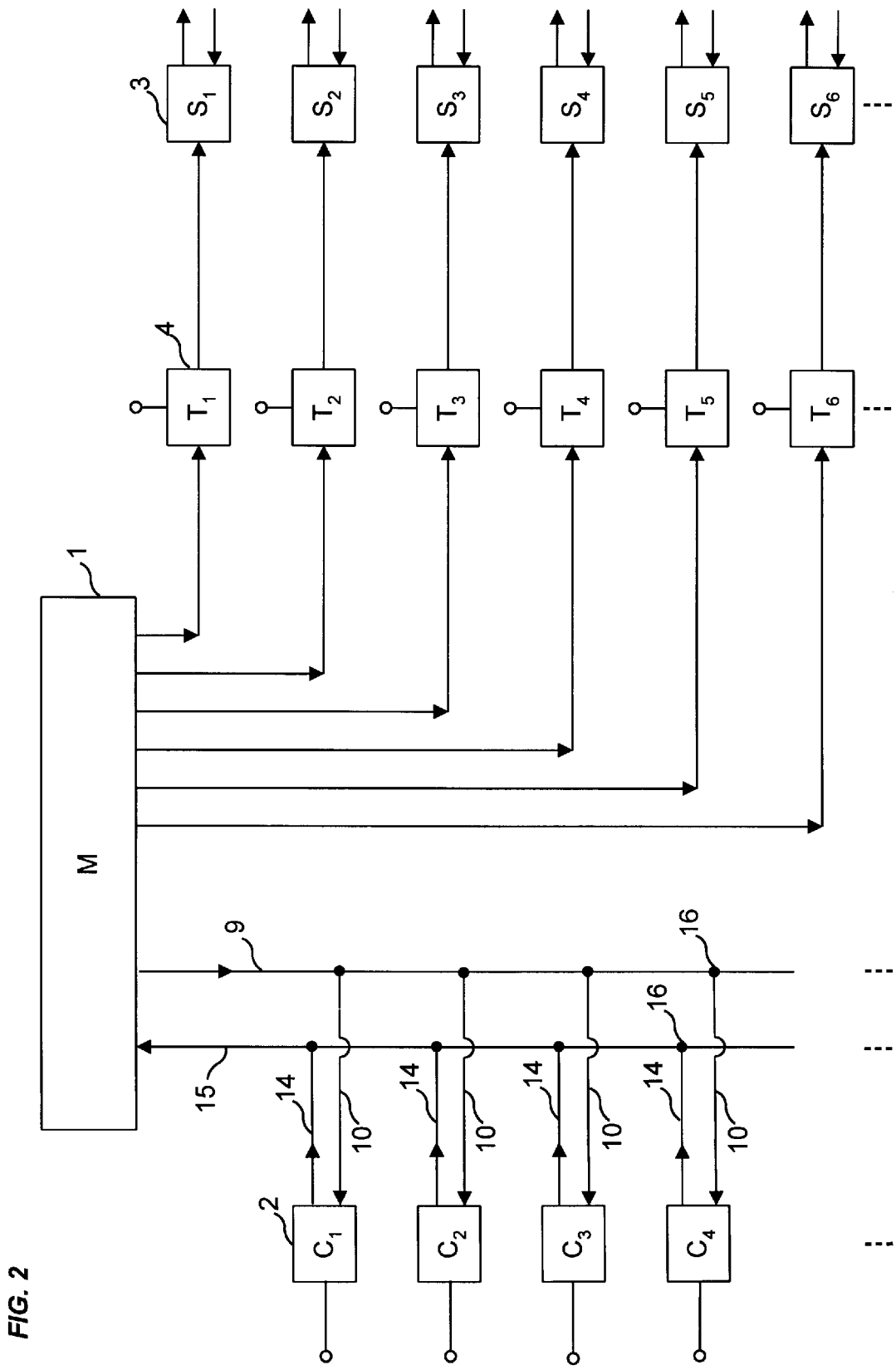
FIG. 2 is a schematic view of an exemplary system of the invention showing the Carriers using a shared data link to provide information to the Moderator.

FIG. 2 illustrates an alternative network architecture in which the individual Carrier-to-Moderator data links 14 share a common data input line 15 into the Moderator 1. This can be done, for example, by means of fiber optics using the SONET transmission protocol and ATM technology. This would require an ATM switching module at each junction 16 between the individual Carrier links 10, 14 and the common Moderator input-output links 9, 15.

Figure 3:
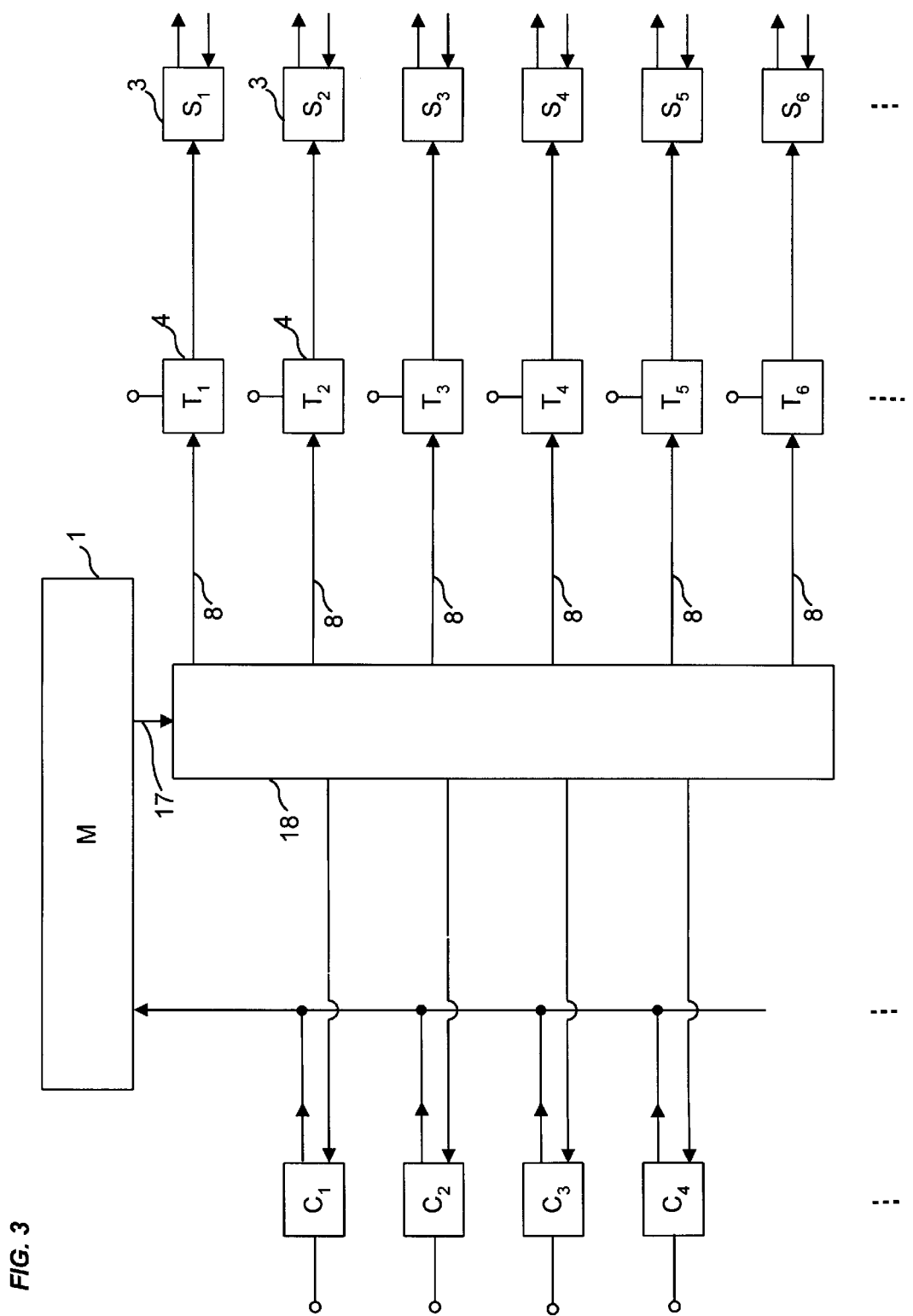
FIG. 3 is a schematic view of an exemplary system of the invention showing switched access from the Moderator to each of the subscribing switches and to each Carrier.

FIG. 3 illustrates an architecture incorporating switched access from the Moderator 1 to the switches 3. In this architecture a single Moderator output link 17 transmits each subscribing switch's bid data to a switch 18, which may be a dedicated switch or part of a public switched network. The bid information appropriate to each subscribing switch 3 is switched to each individual switch data link 8.

Figure 4:
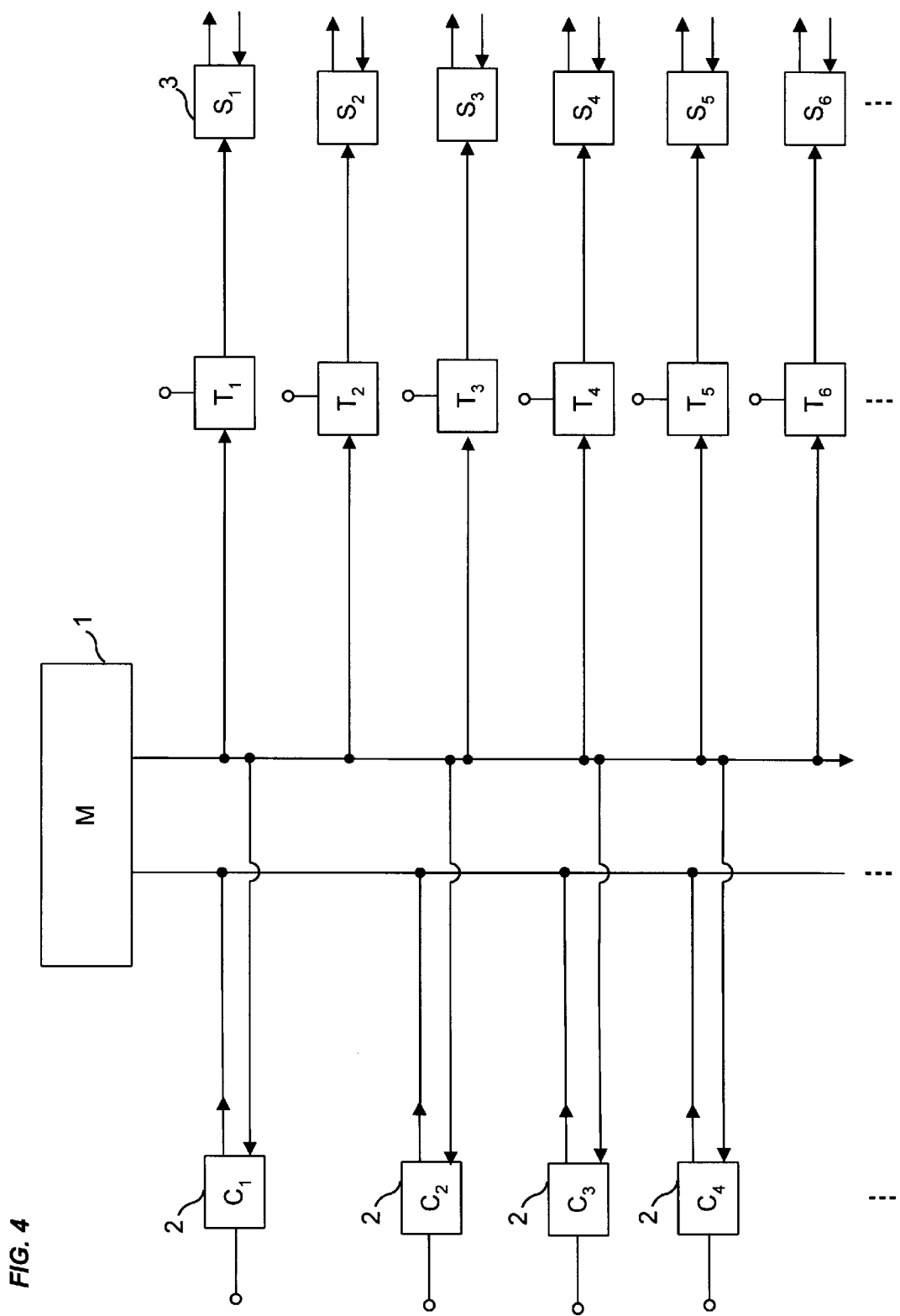
FIG. 4 is a schematic view of an exemplary system of the invention showing use of a shared data facility, such as a local area network, for communication from the Moderator to each of the subscribing switches and to each Carrier.

FIG. 4 illustrates use of shared facilities between the Moderator 1 and each of the switches 3 and the Carriers' network management computers 2. This could be accomplished, for example, by many known local area network (LAN), metropolitan area network (MAN), and wide area network (WAN) technologies.

The economic choices presented to telecommunication service users under this invention depend on bids submitted by Carriers for telecommunication traffic over the routes they serve. Each route is defined by the local exchange switch (or equivalent local switching node) serving its originating point and the local exchange switch (or equivalent local switching node) serving its terminating point. A route may also have an originating point and a terminating point in the same local exchange area. For telephone calls within North America, for example, each local exchange switch on the public switched telephone network is identified in the North American Numbering Plan by a unique NPA-NXX code, where the NPA is a three digit numbering plan area identifier (e.g., area code 201 identifies Northern New Jersey) and NXX is a three digit code identifying a particular local exchange switch within the numbering plan area. It is common for a single switch to house more than one NXX Code. Another arrangement contemplated by the bidding process is for a local exchange carrier, controlling several switches, to receive the bidding or routing data for all its switches and further process that data for all of its switches. The interexchange Carriers that utilize this bidding process are usually identified by a Carrier access code. This code may be, for example, a "1" signifying the end user's primary Carrier, a 5 digit code "10XXX" for a Carrier other than the end user's primary Carrier, or some other code or data element designated for that purpose. Once a Carrier is selected for a call attempt, the appropriate Carrier access code is inserted in the call attempt's routing data, (NPA) NXX-XXXX, the last four digits identifying the particular line served by the called party's NPA-NXX switch. The subscribing switch may also have dedicated direct links to one or more Carrier points of presence. If such a Carrier is selected, the subscribing switch would route the call attempt directly to that link. While the currently predominant numbering scheme for network switching end points on the public switched telephone network is the North American Numbering Plan, other numbering schemes identifying route originating points and terminating points are possible, particularly for other types of telecommunication networks (e.g., for private or public data networks), and may be used as telecommunication technology evolves. International telephone calling, for example, currently uses a country code and a city code before the code that identifies the local exchange switch on the public switched telephone network.

The competing Carriers bid for traffic by transmitting to the Moderator the economic incentive each Carrier will offer for traffic over each route it serves (or, at least, each route it wishes to compete for using the bidding process). The economic incentive presently contemplated as being most usual is the rate (amount of money charged per unit of time). However, many other kinds of economic incentive may be offered, such as a credit toward other services (e.g., frequent flyer points) or a credit toward an additional rebate that may be offered if a user's traffic for a given month rises above a threshold. The economic incentive could be a combination of rate and another incentive. But the economic incentive should be selected from a limited set authorized by the provider of the bidding mechanism, because the incentive must be capable of being evaluated by the software in the Moderator or in each subscribing switch's adjunct computer. A Carrier may wish to submit more than one bid for routes that originate at points at which it offers more than one class of service (e.g., switched service to some subscribers, dedicated access to others, or both classes of service to some).

Each bid must be associated with a time period within which the bid will be effective. The rules of the bidding process can be structured in many ways. The following are examples of possible bidding rules.

a) The day is divided into blocks of time by the bidding service provider and bids are submitted for each block of time. All bids for a given block of time must be submitted prior to a cut-off time that precedes that block of time by a protection interval. Any bid received after the cut-off time is considered to be effective for the next block of time, unless a new bid is subsequently received from the same Carrier for that route. The protection interval is needed to permit processing of the bid information by the Moderator and transmission of carrier selection data or bid information to the switch (or its associated adjunct computer) prior to the bid's start time. For example, if thirty minute blocks of time are auctioned, a five minute protection interval may be appropriate.

b) Carriers are permitted to submit bids for any time interval by specifying a start time and a termination time or a start time and a good-until-cancel instruction. However, no bid can be effective before a protection time interval specified by the bidding service provider. The bidding service provider can provide confirmation of received bids back to the Carrier if the data link from the Moderator to the Carriers is provided with a selective messaging capability.

c) Carriers may be permitted to enter default bids for any route and/or block of time for which they transmit no other bid.

d) As a fail-safe mechanism, to avoid use of old bids that have not been changed due to communication failure, the Moderator may impose a rule setting a time limit (a fail-safe protection time) to the applicability of any bid. At the expiration of the time limit, the expired bid could default to a preset default bid or to no bid. Such a rule could also be built into the switch software to protect against a failure in the Moderator-to-switch data link.

The principal data feedback from the Moderator to the Carriers is the broadcast of bidding data from the Moderator to each of the Carriers. This permits the Carriers to adjust their own bids for any particular route in view of other Carriers' bids for that route. In a block of time bidding scheme this broadcast transmission may take place, in different service offerings, either before or after the bid cutoff time for a given block of time. If broadcast before the cutoff time, the Carriers have an opportunity, up to the cutoff time, to adjust their bids for that block of time. If the service is arranged for broadcast back to the Carriers after the cutoff time, the Carriers can adjust their bids for the next or subsequent blocks of time. If the bids are broadcast back to the Carriers after the cutoff time but before the bid's effective time, the Carriers would be able to manage their networks to take account of that time interval's bid structure. The bids can be adjusted to be higher or lower, dependent on whether the Carrier, in view of the state of its network traffic, wishes to further encourage or discourage additional traffic. The Carrier may wish to reduce its bid, for example, to encourage additional traffic on an underutilized telecommunication facility, or increase its bid to discourage traffic over a facility approaching a congested state. Depending on the transmission and computer technologies used, broadcast back to the Carriers could also be accomplished by posting the bids on a bulletin board system, making them available for retrieval by all Carriers.

An evolutionary development in local exchange switch (or equivalent local switching node) architecture is the combination of a "dumb" switch and a "smart" peripheral computer. In this arrangement the switch accomplishes the actual connection between incoming and outgoing telecommunication facilities and the switch operating software performs the management functions specifically supporting the switching function. The peripheral computer contains the service-related software. This arrangement permits the telecommunication service provider to modify its service offerings without the need to ask the switch manufacturer to change the switch's operating software. Through use of a intelligent peripheral computer, one service that could be offered to all subscribers, including small businesses and individuals, is least cost routing. As in PBX least cost routing, the routing of a call attempt is dependent on population of a routing table. This table is a memory file containing the cost (or other economic incentive) of call carriage over each route accessed by the switch or other carrier selection data. In accordance with the herein disclosed process, this routing table could be populated by the Moderator, based on carrier selection data it generates, or by a computer adjunct to the switch, based on decision rules entered by a switch administrator. Or, with appropriate software, the adjunct computer function could be incorporated in the switch's peripheral computer. With this combination of software implementations, a telecommunication service provider could offer least cost routing service, at economically advantageous rates based on a bidding process, to all of its subscribers.

Figure 11:
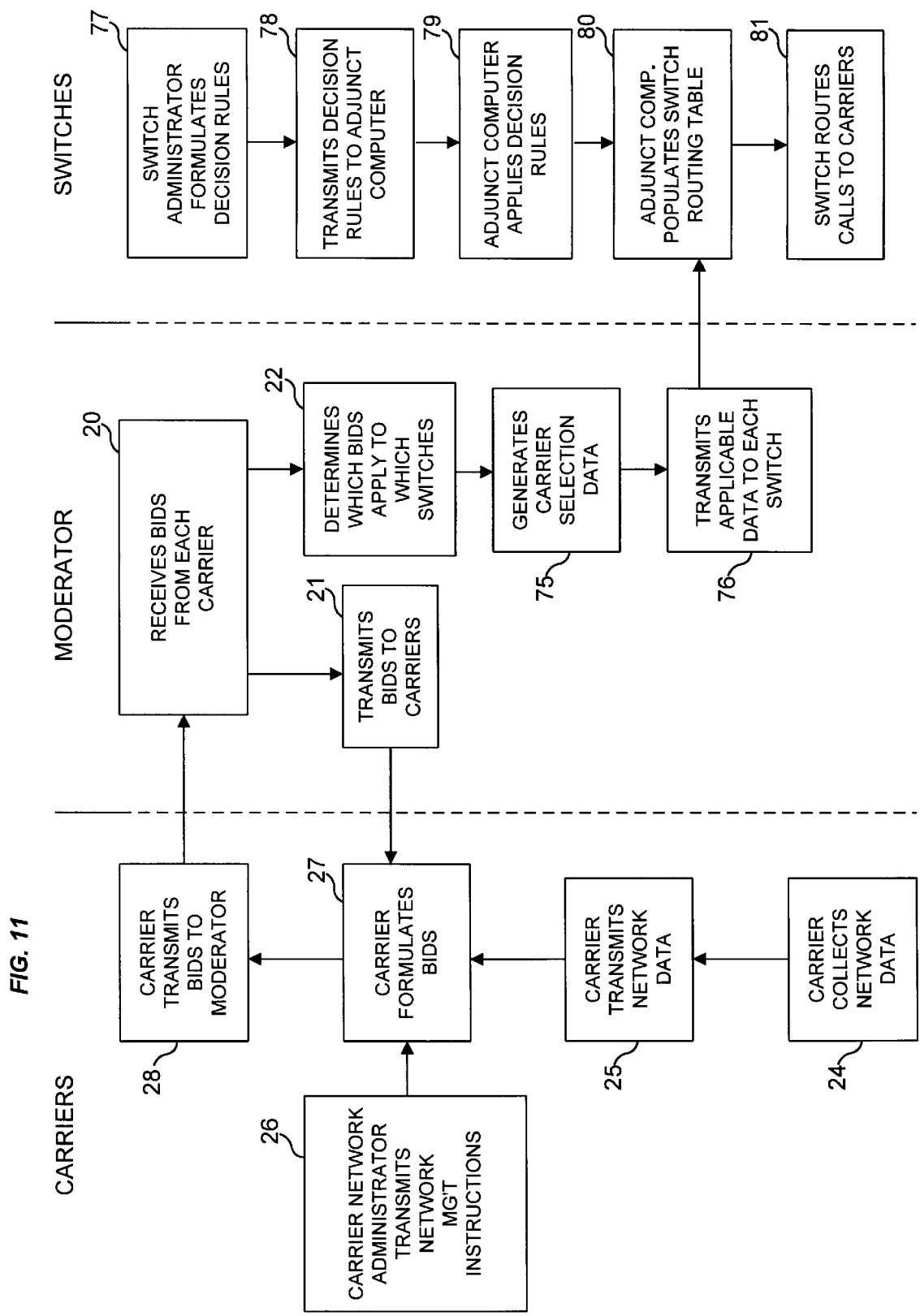
FIG. 11 is a schematic representation of an exemplary process of the invention in which the Moderator generates carrier selection data for the subscribing switches.

As illustrated in FIG. 11, the routing table can be populated with derivative data generated 75 in the Moderator by further processing of the economic incentive data. This could include Carrier selection data, prioritizing the Carrier selection in accordance with Carriers' bids for each route originating at the switch. The applicable data can be transmitted 76 to each switch, including those in which the adjunct computer populates the switch's routing table 80. While some of the decision making process has been performed by the Moderator (i.e., sorting its bids and generating carrier selection data), the switch makes the ultimate Carrier selection based on network conditions and decision rules from the administrator 77. The network architecture involved is as illustrated in FIG. 8, where the switch 3 represents the combination of the dumb switch and the intelligent peripheral computer and the input and output links 12, 13 represent all of the telecommunication facilities accessed by the switch 3.

The bid information being transmitted between the Moderator, the Carriers, and subscribing switches is sensitive business information and may need, under various circumstances, to be encrypted. Depending on how the service is arranged, there may be a need to protect the privacy of bids from interception by other participating Carriers or from interception by non-participating Carriers. Some of the most sensitive information would be bid information sent from the Carriers to the Moderator and bid confirmation messages from the Moderator to the Carriers. Some less sensitive information would be the bids broadcast back to all participating Carriers after the cutoff time for a given block of time. There are several encryption schemes known in the art for such use, including the RSA and PGP schemes.

Figure 5:
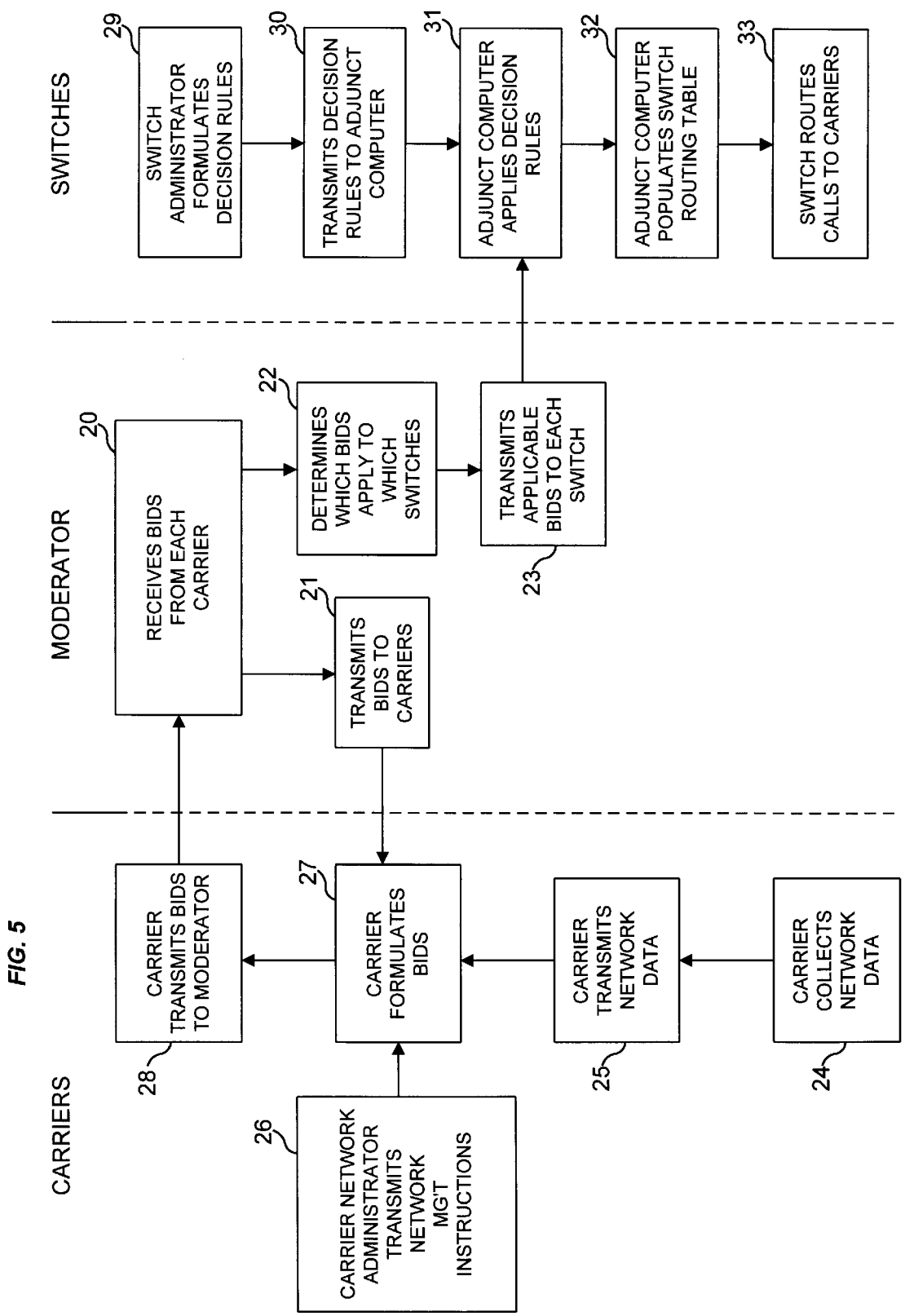
FIG. 5 is a schematic representation of an exemplary process of the invention showing transmission of bid information from the Moderator to the subscribing switches.

FIG. 5 illustrates an exemplary implementation of the bidding process of this invention. The process is carried out by participating Carriers, acting through their network management computers, the bidding service provider, acting through the Moderator computer, and the subscribing switches. The Carriers' primary purpose is to maximize revenue from the carriage of telecommunication traffic over their networks. The subscribing switches are usually managed to obtain telecommunication service most economically.

In operation of this exemplary bidding process, the Moderator receives bids 20 from each Carrier specifying the economic incentive the Carrier is willing to offer for carrying a call over each route for which it wishes to place a bid. This information is stored in the computer's memory. At a time appropriate to the particular service arrangement in operation, the Moderator transmits 21 bids received from the Carriers to at least a portion of the Carriers. The Moderator also processes the data in a sorting operation to determine which bids and/or Carrier selection data derived from the bids, are for routes that have an originating point associated with each subscribing switch and transmits 23 the appropriate bids to each such switch.

Each subscribing switch is operated by a switch administrator that formulates 29 the decision rules. A decision rule may be, for example, a simple instruction to switch a call attempt to the Carrier that has submitted the lowest cost bid. The rules may include an instruction to route all calls in a particular time period (e.g., from midnight to 6:00 A.M.) to a particular Carrier to satisfy the requirements of a contract between the switch's owner and that Carrier, or because that Carrier has contracted to carry all traffic during that time period for a flat monthly fee. The switch administrator may also instruct the switch or an associated adjunct computer to value a non-rate economic incentive in a particular way. The bids and decision rules are received by the switch or associated adjunct computer and stored in a data base in its memory. The switch or associated adjunct computer applies 31 the decision rules to the economic incentive data received as bids and generates the Carrier selection data needed to populate the switch's routing table. The decision rules may be transmitted to the Moderator and the carrier selection data can be generated in the Moderator. The carrier selection data can be transmitted to the switch periodically, when generated, or in response to a query from the switch. The query can call for the carrier selection data in full or on a call-by-call basis. The routing table is the file that is accessed by the switch's least cost routing software to decide which Carrier will receive a call attempt. The software will also provide for treatment of failed call attempts (e.g., retry, try the next lowest cost Carrier, or default to the primary Carrier). When a call attempt is presented to the switch, a routing decision is made and the call routed 33 to a Carrier for transmission to the call's destination. In order to route a call, the subscribing switch's operating software connects the input register carrying the call attempt to the output register connected to telecommunication facilities which connect to the selected Carrier for that route.

The transmission of bid information between the Carriers and the Moderator is a feed back process. Each Carrier transmits 28 its economic incentive bids to the Moderator and the Moderator transmits 21 received bids to each Carrier or at least the portion of the Carriers appropriate to each bid. The Carrier starts its bid formulation by collecting 24 network data, such as the capacity and traffic loading of each network facility, and transmitting 25 this network data to the Carrier's network management computer. The network data can be entered by keying it in or entered over a data link from the Carrier's network operations systems. The Carrier's network administrator enters (e.g., by keying them in or by data link) network management instructions, such as the fact that a particular facility is being taken out of service for maintenance or has a trouble that reduces its transmission capacity. The network management instructions could also be based on network performance characteristics, such as response time, or competitive business factors, such as the intent to compete more intensively for traffic to a specific region of the country or over routes that compete directly with another specified Carrier.

Software within each Carrier's network management computer then accesses its memory for the network data, the network management instructions, and the bid data received from the Moderator and determines 27 the economic incentive the Carrier will bid for traffic over each route. These data are accessed by means of the data buses and registers commonly internal to a computer. These bids are stored in the computer memory and transmitted 28 to Moderator. Since the network management computer has access to the bids of other Carriers, during each bidding cycle each Carrier has the opportunity to adjust its bids in view of the bids of the other Carriers for traffic over each route. This adjustment may be accomplished automatically by the software in response to the network management instructions, or may be accomplished by direct input from the network administrator viewing displayed bidding data. The result of such adjustment consideration may be a decision to leave the bid as originally calculated, as being appropriate to accomplish the network administrator's objective.

Figure 6:
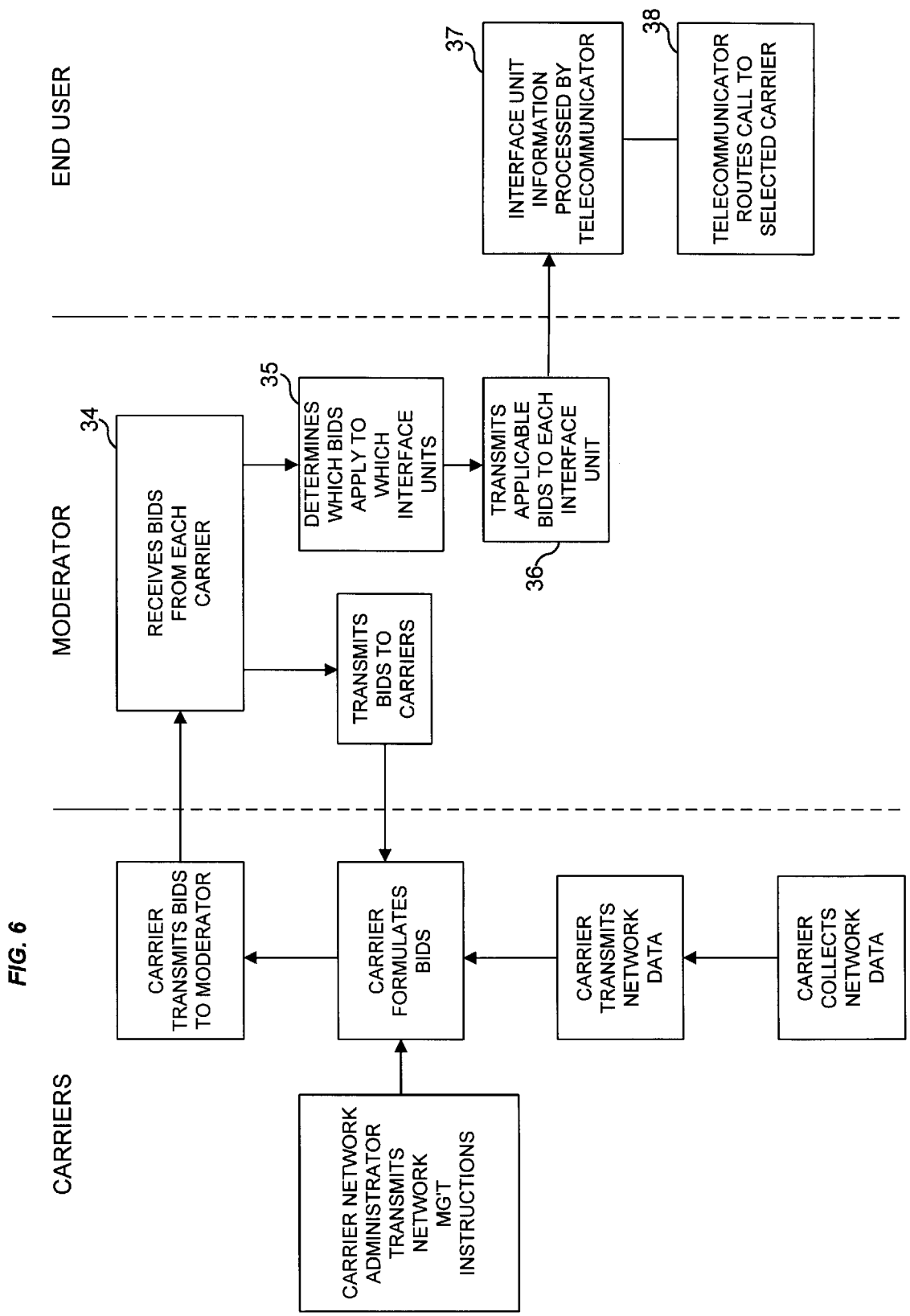
FIG. 6 is a schematic representation of an exemplary process of the invention showing transmission of information from the Moderator directly to end users.

FIG. 6 illustrates a process by which Carriers submit bids directly to end users for traffic originating in a specified local exchange area (e.g., an NPA-NXX or a group of NPA-NXXs, including a group comprising all NPA-NXXs in the North American Numbering Plan) and terminating anywhere. Here the Moderator receives bids 34 as before. However, the bids are independent of terminating point. The Moderator processes the data to sort it by originating point to determine 35 which bids apply to which end users, each end user having an interface unit to receive and store the data. The Moderator then transmits 36 the bid data and/or Carrier selection data for a particular local exchange area to the interface units of all subscribing end users in such local exchange area (e.g., all subscribing end users served by the local exchange switch for a specific NPA-NXX), as interface unit information. The information may be displayed for evaluation by the end user or processed, within the interface unit, with direction from the end user, and all outgoing calls routed to the selected Carrier. If the Carrier information is displayed for the end user, the end user can choose a Carrier for a call attempt and key in the selected Carrier's carrier identification code before the desired destination address (e.g., telephone number). If the information is processed automatically within an interface unit, in the line or wireless connection between the end user's terminal equipment and the local exchange switch (or equivalent local switching node) or an interexchange Carrier's point of presence, the interface unit can, for example, automatically insert the appropriate carrier identifier in the outgoing telephone numbers. The interface unit could be a stand-alone piece of equipment, an attachment incorporated into the end user's terminal equipment or a software-defined portion of the end user's terminal equipment.

At the end user, the degree of automation of the process depends on the particular telecommunication terminal equipment being used. If the terminal equipment is a simple telephone, the telecommunicator function 37 specified in FIG. 6 may consist of the end user reading the bids from a display screen in the interface unit, making the routing decision, and routing 38 the call attempt by keying in the selected Carrier access code. If the terminal equipment is more complex, such as a personal computer or other microprocessor-containing equipment, the decision can be software implemented. The Carrier access code could be inserted by the terminal equipment or by the interface unit, if the interface unit is in the end user's telecommunication access line or wireless connection to the telecommunication network.

Figure 7:
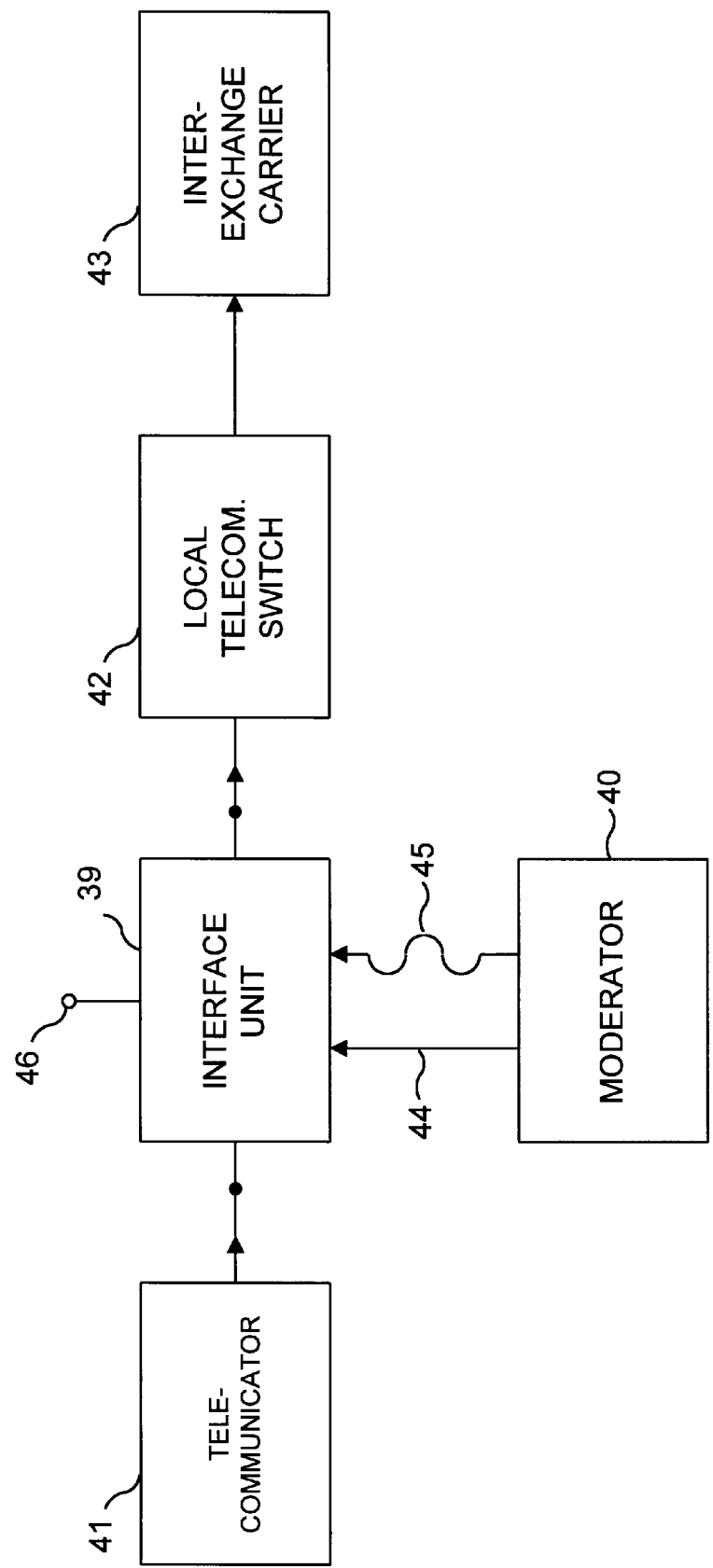
FIG. 7 is a schematic view of an exemplary end user portion of a system of the invention.

FIG. 7 illustrates the interface unit's position within the bidding architecture of FIG. 6. The interface unit 39 receives bid data or Carrier selection data from the Moderator 40 over a telecommunication facility that may be a wire link 44 or a wireless link 45. The interface unit has either a wired input port or contains a wireless receiver (e.g., radio or optical). The interface unit 39 is in the telecommunication path between the telecommunicator and the external telecommunication network, such as the local exchange switch 42 that routes the call to the selected interexchange Carrier 43 in response to the Carrier access code. The interface unit may have a separate end user input port 46 for use by the end user to key in the selected Carrier access code each time a call is placed. The end user may also be able to key in a Carrier selection and the interface unit may contain a tone generator or digital signal generator necessary to automatically insert the Carrier access identification code for each call attempt. The interface unit 39 may also have a screen to display the bid information to the end user.

Figure 10:
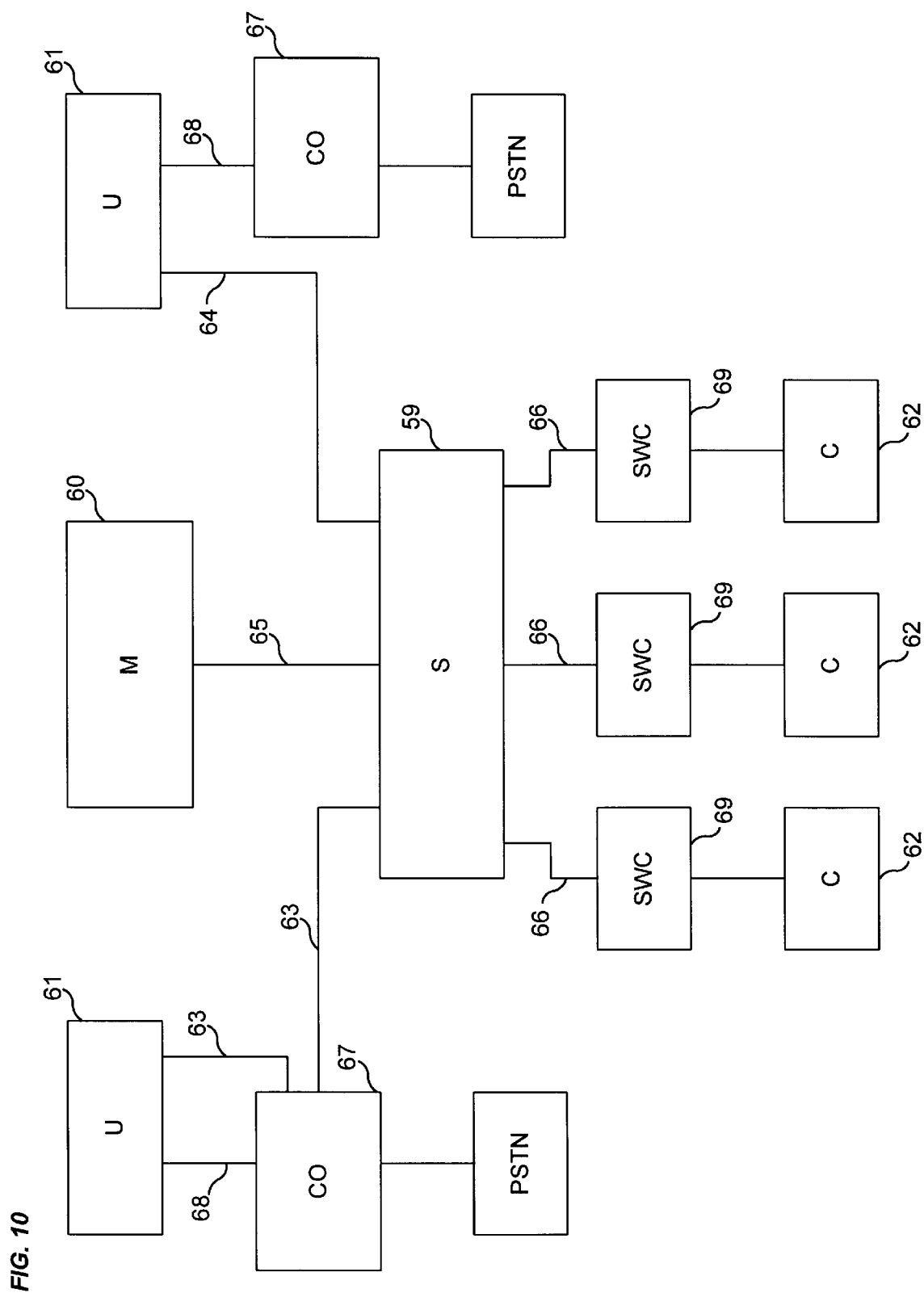
FIG. 10 is a schematic view of an exemplary network architecture in which a Moderator transmits data to a dedicated facility switch.

FIG. 10 illustrates a network architecture that enables large users 61 that route telecommunication traffic to interexchange Carriers 62 over dedicated access lines 63, 64 to take advantage of a bidding arrangement. In this architecture a bidding Moderator 60 transmits the processed bidding data over a data link 65 independent of the dedicated access facilities 63, 64 carrying the calls from the users 61 to a switch 59 equipped with input and output ports adapted to receive dedicated facilities 63, 64, 66. The bidding data link 65 is also independent of any common channel signaling network associated with the dedicated facilities 63, 64, 66. The dedicated access facilities 63 may be connected through a local exchange telephone carrier's local central office 67 or routed directly 64 from the users PBX 61 (or other hardware or software-driven originating facilities) to the switch 59.

The users 61 will, typically, also have switched access facilities 68 to a local exchange telephone carrier's local central office 67.

This dedicated facility switch 59 has a switching matrix for switching calls and a software directed switch controller for selecting a Carrier 62 for a call, based on carrier selection data resulting from the bidding process, and routing the call to the selected Carrier 62. The call is switched to the dedicated Carrier facility 66 connected to the selected Carrier 62, perhaps by way of a serving wire center 69. Through this architecture large users 61 carrying interexchange traffic over dedicated facilities can benefit from the bidding process and avoid the access charges imposed by local exchange telephone carriers on central office switched access traffic. Even though a dedicated facility 63 may connect through a local exchange telephone carrier's local central office 67, it is given a dedicated, unswitched connection, not triggering the imposition of a switched access rate element.

Figure 12:
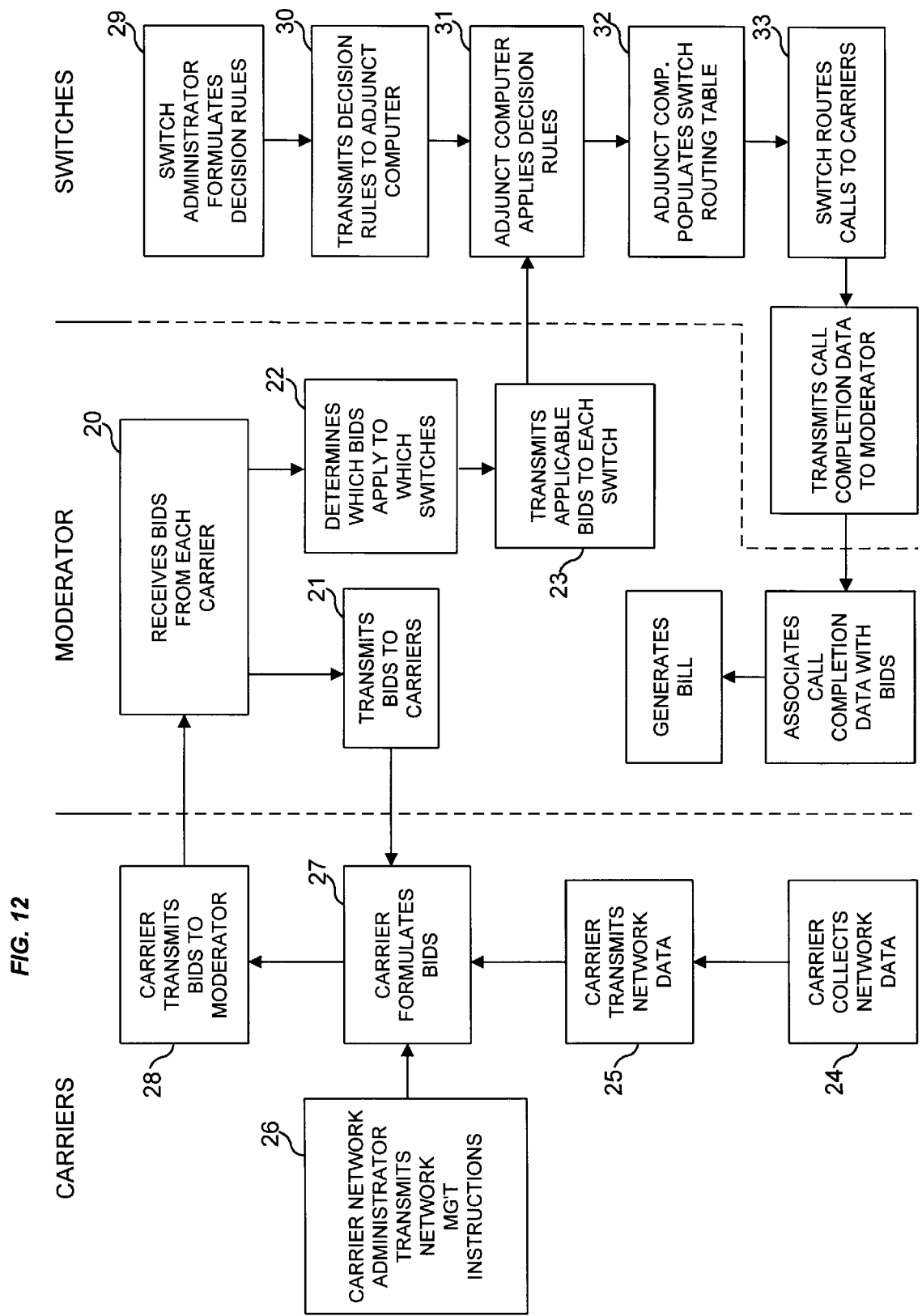
FIG. 12 is a schematic representation of an exemplary process of the invention, including a billing capability.

In order not to require each end user subscribing to the bidding arrangement to establish a billing relationship with each Carrier taking part in the bidding process, a central billing arrangement is advantageous. In the billing arrangement illustrated in FIG. 12, the bidding and routing takes place as illustrated in FIG. 5. After the switch routes a call 33, it transmits the call completion data identifying the call source, the Carrier, and any other information necessary for billing purposes (e.g., the time and duration of the call) to the Moderator. The Moderator associates the call completion information with the bidding information in its memory to form a billing record of the call, which is stored in a billing data base. Periodically (e.g., at the end of each billing period) the Moderator sorts the billing records by call source identifier and generates a bill.

As an alternative to the Moderator preparing bills, a local exchange telephone carrier, for example, can generate bills for those of its customers participating in the bidding process as callers, by having a computer associated with one or more switches receive economic incentive data from the Moderator and call completion data from the switch. This computer associates the bidding information with the call completion information in its memory to form a billing record of the call, which is stored in a billing data base. Periodically, the computer sorts the billing records by call source identifier and generates a bill.

What is claimed is:

1. A method for controlling a telecommunication network in which a moderating computer collects economic incentive data from each Carrier of a plurality of telecommunications Carriers, processes the economic incentive data and distributes processed data to a plurality of telecommunications switches, each switch associated with an originating point, thereby enabling each of the plurality of switches to select a Carrier of the plurality of telecommunication Carriers for a call attempt presented to the switch, based on an economic choice, wherein the method comprises:

a. receiving in the moderating computer, economic incentive data specifying the economic incentive each Carrier will place on a call from each originating point of a plurality of originating points to each terminating point of a plurality of terminating points, processing the economic incentive data to determine which of the economic incentive data correspond to a first originating point and to produce derivative data, and storing the economic incentive data and derivative data in a data base of the moderating computer as first originating point data;

b. identifying a first set of telecommunication switches of the plurality of switches, each switch associated with the first originating point, and transmitting at least a portion of the derivative data, but none of the economic incentive data, to the first set of telecommunication switches; and c. transmitting at least a portion of the first originating point data to at least a portion of the plurality of telecommunication Carriers.

2. A method of claim 1 in which the economic incentive data is rate data.

3. A method of claim 1 in which the economic incentive data received from each Carrier is valid for a specified first block of time.

4. A method of claim 3 in which the first block of time is specified by a start time and a good-until-cancel instruction.

5. A method of claim 3 in which the economic incentive data valid for the first block of time must be received by the moderating computer prior to a cut-off time that precedes the first block of time by at least a protection interval.

6. A method of claim 3 in which the economic incentive data includes a specification of subsequent blocks of time for which the economic incentive data is valid.

7. A method of claim 1 in which the first originating point data corresponding to a first Carrier of the plurality of Carriers is the same for all terminating points.

8. A method of claim 1 in which the first originating point data corresponding to a first Carrier of the plurality of Carriers is the same for all originating points and all terminating points.

9. A method of claim 1 in which the derivative data includes carrier selection data.

10. A method of claim 9 in which the carrier selection data includes designation of the selected Carrier.

11. A method of claim 9 in which the carrier selection data includes designation of at least a first alternate Carrier.

12. A method of claim 1 in which each element of the first originating point data is valid only for a fail-safe protection time.

13. An automated Carrier selection method for enabling a telecommunication switch, the switch being associated with an originating point, to select a Carrier of the plurality of telecommunication Carriers for a call attempt in accordance with carrier selection data received from a bidding Moderator, for transmission of telecommunications to a first terminating point, comprising the steps of:

a. entering into a data base associated with the switch, the carrier selection data resulting from a bidding process administered by the bidding Moderator ad relating to at least one Carrier of the plurality of telecommunication Carriers corresponding to the first terminating point; and b. selecting a Carrier of the plurality of telecommunication Carriers for the call attempt, based on the carrier selection data.

14. A method of claim 13 in which, for a failed call attempt, a first alternate Carrier, of the plurality of telecommunication Carriers is selected for the call attempt, in accordance with the carrier selection data.

15. A method of claim 13 in which, for a failed call attempt, a default Carrier of the plurality of telecommunication Carriers is selected for the call attempt.

16. A method of claim 13 including displaying at least a portion of the economic incentive data at the switch.

17. A method of claim 13 including overriding the Carrier selection and selecting an alternate Carrier on the basis of decision rules from a switch administrator.

18. A method for routing a telecommunication call attempt presented to a telecommunication switch associated with an originating point to a first telecommunication Carrier of a plurality of telecommunication Carriers in accordance with economic incentives arrived at through a bidding process involving a central processor, referred to as a bidding moderator, comprising the steps of:

a. collecting carrier network data for each of the Carriers, each Carrier entering the data corresponding to the telecommunication facilities constituting its network into its traffic management computer's traffic management database;

b. each traffic management computer receiving management instructions from that Carrier's network administrator, formulating economic incentives for at least a portion of the Carrier's telecommunication facilities based on the management instructions and the carrier network data, and transmitting the economic incentives to the bidding moderator;

c. in the moderator, receiving the economic incentives, entering the economic incentives from each Carrier in the Moderator's database, and sorting the economic incentives to identify all economic incentives associated with each telecommunication route specified by an originating point and a terminating point and generating carrier selection data;

d. transmitting at least a portion of the economic incentives received by the Moderator to at least a portion of the plurality of Carriers, entering the economic incentives in each traffic management database, and adjusting each Carrier's economic incentives in consideration of the economic incentives from at least one other Carrier;

e. sorting the routes to determine which routes have an originating point associated with the telecommunication switch, transmitting the carrier selection data but not the economic incentives associated with such routes to the switch, and entering the carrier selection data into the switch's database; and f. routing the call attempt to the first telecommunication Carrier in accordance with the carrier selection data.

19. A method of claim 18 which the economic incentive is rate.

20. A method of claim 18 including displaying at least a portion of the economic incentives at the traffic management computer of at least one of the plurality of Carriers.

21. A method of claim 18 including querying the moderator for the carrier selection data.

22. A telecommunication traffic bidding moderator for enabling a first telecommunication switch of a plurality of telecommunication switches to select a Carrier of the plurality of telecommunication Carriers for call attempts, in accordance with economic incentives generated by the Carriers, comprising:

a. a computer with a processor and a memory;

b. means for receiving economic incentive data from a first telecommunication Carrier and storing the economic incentive data identified with the first telecommunication Carrier in the memory;

c. means for transmitting at least a portion of the economic incentive data received from a plurality of telecommunication Carriers to at least a portion of the plurality of telecommunication Carriers;

d. means for sorting the economic incentive data received from the plurality of telecommunication Carriers to determine a first subset of such data corresponding to the first telecommunication switch and generating carrier selection data; and e. means for transmitting the carrier selection data, but none of the economic incentive data, to the first telecommunication switch.

23. A Moderator of claim 22 further including means for receiving decision rules from a switch administrator associated with the first telecommunication switch and applying the decision rules to the economic incentive data to generate the carrier selection data.

24. An automated call routing system for selecting a first telecommunication Carrier of a plurality of telecommunication Carriers for a call attempt presented to a telecommunication switch, comprising:
   a. a telecommunication switch;
   b. a computer adjunct to the telecommunication switch, which adjunct computer has a processor and a memory;
   c. means for receiving carrier selection data from a bidding Moderator, such carrier selection data resulting from a bidding process administered by the bidding Moderator, and storing the carrier selection data in the memory;
   d. means for transmitting the carrier selection (data to the switch for entry into the switch's database; and
   e. means for selecting the first telecommunication Carrier for the call attempt, based on the carrier selection data in the switch's database.

25. A call routing system of claim 24 in which the switch comprises a dumb switch and an intelligent peripheral computer.

26. A call routing system of claim 25 in which the adjunct computer is a software defined portion of the intelligent peripheral computer.

27. A call routing system of claim 24 including means for querying the bidding Moderator for the carrier selection data.

28. An automated call routing system for routing a call attempt presented to a telecommunication switch to a first telecommunication Carrier of a plurality of telecommunication Carriers, comprising;
   a. a telecommunication switch;
   b. means for querying a bidding Moderator for carrier selection data corresponding to the call attempt, said carrier selection data resulting from a bidding process administered by the bidding Moderator, and receiving the carrier selection data in the switch; and
   c. means for routing the call attempt to the first telecommunication Carrier in accordance with the carrier selection data.

29. A telecommunication Carrier selection method in which a moderating computer collects economic incentive data from each Carrier of a plurality of telecommunication Carriers, processes the economic incentive data to generate Carrier selection data and distributes the carrier selection data to a plurality of interface units, each interface unit being associated with one of a plurality of telecommunicators and each associated with an originating point, thereby enabling each of the plurality of telecommunicators to select a Carrier of the plurality of telecommunication Carriers for each call attempt generated by the telecommunicator, wherein the method comprises:
   a. receiving in the moderating computer, economic incentive data specifying the economic incentive each Carrier will place on a call from a first originating point, generating carrier selection data and storing the economic incentive data and the carrier selection data in a data base;
   b. identifying a first set of interface units of the plurality of interface units, each interface unit of the first set of interface units associated with the first originating point, and transmitting the carrier selection data but not the economic incentive data to each of the first set of interface units; and
   c. transmitting at least a portion of the economic incentive data to at least a portion of the plurality of telecommunication Carriers.

30. A method of claim 29 including displaying the carrier selection data on a display device in the interface unit.

31. A method of claim 29 including routing all call attempts to telecommunication Carriers, on the basis of the carrier selection data, each call attempt including routing data.

32. A method of claim 31 including inserting a carrier identifier, identifying the telecommunication Carrier, in the routing data of each call attempt.

33. A method of claim 31 in which the carrier identifier is inserted automatically by the interface unit.

34. A telecommunication traffic bidding moderator for enabling a first telecommunicator of a plurality of telecommunicators, the first telecommunicator being associated with a first originating point, to select a first telecommunication Carrier of a plurality of telecommunication Carriers for a call attempt in accordance with economic incentives generated by the Carriers, comprising:
   a. a computer with a processor and a memory;
   b. means for receiving economic incentive data from a first telecommunication Carrier and storing the economic incentive data, identified with the first telecommunication Carrier in the memory;
   c. means for transmitting at least a portion of the economic incentive data received from a plurality of telecommunication Carriers to at least a portion of the plurality of telecommunication Carriers;
   d. means for processing the economic incentive data received from the plurality of telecommunication Carriers to generate carrier selection data corresponding to the first originating point; and
   e. means for transmitting the carrier selection data corresponding to the first originating point, but not the economic incentive data to a first interface unit associated with the first telecommunicator.

35. A moderator of claim 34 in which the means for transmitting the carrier selection data includes means for wireless transmission of the carrier selection data corresponding to the first originating point to a wireless receiver in the first interface unit.

36. A moderator of claim 34 in which the means for transmitting carrier selection data is adapted for transmitting the data to all telecommunicators associated with a set of first originating points.

37. An interface unit for routing a call attempt placed by a telecommunicator to a first telecommunication Carrier of a plurality of telecommunication Carriers in response to carrier selection data received from a moderator and decision rules received from an end user, the unit comprising:
   a. a first input port for receiving the call attempt from the telecommunicator, the call attempt including routing data;
   b. a second input port for receiving the decision rules from the end user;
   c. means for receiving the carrier selection data from the moderator;
   d. a processor for selecting the first telecommunication Carrier in response to the economic incentive data and the decision rules;

e. means for inserting a first Carrier identifier, corresponding to the first telecommunication Carrier into the routing data; and f. an output port for transmitting the call attempt.

38. An interface unit of claim 37 in which the means for receiving economic incentive data includes a wireless transmission receiver.

39. An interface unit of claim 37 further including a display device for displaying at least a selected portion of the economic incentive data.

40. A telecommunication switch for selecting a first Carrier of a plurality of telecommunication Carriers for routing a call entering the switch over a dedicated facility, from a first originating point to the first Carrier, based on first originating point data produced by a bidding moderator through a bidding process, the telecommunication switch comprising;

a. a switching matrix controlled by a software directed switch controller;

b. a plurality of input ports for receiving call attempts presented to the telecommunication switch over dedicated access facilities from a plurality of call sources;

c. a plurality of output ports for transmitting the call attempts to a plurality of telecommunication Carriers over dedicated carrier facilities;

d. a data link input port for receiving first originating point data from the bidding moderator over a data link independent of the dedicated access facilities and the dedicated carrier facilities;

e. software implemented means for selecting the first Carrier on the basis of the first originating point data from a data link independent of the dedicated access facilities or the dedicated carrier facilities; and f. means for routing the call attempt from the call source to the first Carrier through the switching matrix.

41. A method of claim 40 in which, for a failed call attempt, a first alternate Carrier, of the plurality of telecommunication Carriers is selected for the call attempt, in accordance with the carrier selection data.

42. A method of claim 40 in which, for a failed call attempt, a default Carrier of the plurality of telecommunication Carriers is selected for the call attempt.

43. A switch of claim 40 in which the first originating point data comprises economic incentive data.

44. A switch of claim 40 in which the first originating point data comprises Carrier selection data, but no economic incentive data.

45. A switch of claim 40 including means for overriding the selection produced by the means for selecting the first Carrier, and selecting an alternate Carrier, in accordance with carrier designation data associated with the dedicated access facility carrying the call.

46. A method for controlling a telecommunications network in which a moderating computer collects economic incentive data from each Carrier of a plurality of telecommunication Carriers, processes the economic incentive data and distributes processed data to a plurality of telecommunication switches, each switch associated with an originating point, thereby enabling each of the plurality of switches to select a Carrier of the plurality of telecommunication Carriers for a call attempt presented to the switch, based on an economic choice, wherein the method comprises:

a. receiving in the moderating computer, economic incentive data specifying the economic incentive each Carrier will place on a call from each originating point of a plurality of originating points to each terminating point of a plurality of terminating points, processing the economic incentive data to determine which of the economic incentive data correspond to a first originating point and to produce derivative data, and storing the economic incentive data and derivative data in a data base of the moderating computer as first originating point data;

b. identifying a first set of telecommunication switches of the plurality of switches, each switch associated with the first originating point, and transmitting at least a portion of the first originating point data to a portion of, but less than all of, the first set of telecommunication switches; and c. transmitting a portion of, but less than all of, the first originating point data to each of the plurality of telecommunication Carriers.

47. A method of claim 46 in which the economic incentive data is rate data.

48. A method of claim 46 including selecting a first Carrier of the plurality of telecommunication Carriers for the call attempt.

49. A method of claim 48 in which the selecting of the first Carrier is based on the derivative data.

50. A method of claim 46 in which the portion of the economic incentive data associated with the selection made for the call attempt is transmitted to the call attempt's originator.

51. A method of claim 50 in which transmission of the economic incentive data portion results in an audible announcement to the call attempt's originator.

52. A method of claim 46 including querying the moderating computer for at least a part of the first originating point data.

53. A method for routing a telecommunication call attempt presented to a telecommunication switch associated with an originating point to a first telecommunication Carrier of a plurality of telecommunication Carriers in accordance with economic incentives arrived at through a bidding process involving a central processor, referred to as a bidding moderator, comprising the steps of:

a. collecting Carrier network data for each of the Carriers, each Carrier entering the data corresponding to the telecommunication facilities constituting its network into its traffic management computer's traffic management database;

b. each traffic management computer receiving management instructions from that Carrier's network administrator, formulating economic incentives for at least a portion of the Carriers telecommunication facilities based on the management instructions and the Carrier network data, and transmitting the economic incentives to the bidding Moderator;

c. in the Moderator, receiving the economic incentives, entering the economic incentives from each Carrier in the Moderator's database, and sorting the economic incentives to identify all economic incentives associated with each telecommunication route specified by an originating point and a terminating point and generating carrier selection data;

d. transmitting at least a portion of the economic incentives received by the Moderator to at least a portion of the plurality of Carriers, entering the economic incentives in each traffic management database, and adjusting each Carrier's economic incentives in consideration of the economic incentives from at least one other Carrier;

e. in the Moderator receiving call attempt data from the telecommunication switch, identifying the originating point and the terminating point associated with the call attempt, selecting the first telecommunication Carrier, and transmitting the first telecommunication Carrier selection to the telecommunication switch; and f. routing the call attempt to the first telecommunication Carrier in accordance with the selecting.

54. A method for controlling a telecommunication network in which a moderating computer collects economic incentive data from each Carrier of a plurality of telecommunications Carriers, processes the economic incentive data and distributes processed data to a plurality of telecommunications switches, each switch associated with an originating point, thereby enabling each of the plurality of switches to select a Carrier of the plurality of telecommunication Carriers for a call attempt presented to the switch, based on an economic choice, wherein the method comprises:

a. receiving in the moderating computer, economic incentive data specifying the economic incentive each Carrier will place on a call from each originating point of a plurality of originating points to each terminating point of a plurality of terminating points, processing the economic incentive data correspond to a first originating point and to produce derivative data, and storing the economic incentive data and derivative data in a data base of the moderating computer as first originating point data;

b. identifying a first set of telecommunication switches of the plurality of switches, each switch associated with the first originating point, and transmitting at least a portion of the derivative data, including a portion but not all of the economic incentive data, to the first set of telecommunication switches; and c. transmitting at least a portion of the first originating point data to at least a portion of the plurality of telecommunication Carriers.

* * * * *